United States Patent
Lu

(10) Patent No.: US 9,549,161 B2
(45) Date of Patent: Jan. 17, 2017

(54) IMAGE AND VIDEO IN MOSAIC FORMATS

(71) Applicant: SAMSUNG DISPLAY CO., LTD., Yongin, Gyeonggi-Do (KR)

(72) Inventor: Ning Lu, Saratoga, CA (US)

(73) Assignee: Samsung Display Co., Ltd., Yongin-si (KR)

( * ) Notice: Subject to any disclaimer, the term of this patent is extended or adjusted under 35 U.S.C. 154(b) by 130 days.

(21) Appl. No.: 14/294,060

(22) Filed: Jun. 2, 2014

(65) Prior Publication Data

US 2015/0009407 A1  Jan. 8, 2015

Related U.S. Application Data

(60) Provisional application No. 61/843,871, filed on Jul. 8, 2013.

(51) Int. Cl.
*H04N 5/232* (2006.01)
*H04N 9/76* (2006.01)
*H04N 9/04* (2006.01)
*G06T 3/40* (2006.01)

(52) U.S. Cl.
CPC .......... *H04N 9/76* (2013.01); *G06T 3/4015* (2013.01); *H04N 9/045* (2013.01)

(58) Field of Classification Search
CPC .......... G06T 3/4015; H04N 9/045; H04N 9/76
See application file for complete search history.

(56) References Cited

U.S. PATENT DOCUMENTS

| 5,828,406 A | * | 10/1998 | Parulski | H04N 1/0044 348/220.1 |
| 7,787,026 B1 | * | 8/2010 | Flory | H04N 1/2166 348/231.99 |
| 2003/0002707 A1 | | 1/2003 | Reed et al. | |
| 2009/0040362 A1 | * | 2/2009 | Glenn | H04N 9/045 348/342 |
| 2011/0090242 A1 | | 4/2011 | Cote et al. | |
| 2011/0150330 A1 | | 6/2011 | Jannard et al. | |
| 2013/0127002 A1 | * | 5/2013 | Okigawa | H01L 27/14627 257/432 |

(Continued)

FOREIGN PATENT DOCUMENTS

| KR | 10-2010-0053558 A | 5/2010 |
| KR | 10-2010-0059280 A | 6/2010 |

(Continued)

OTHER PUBLICATIONS

Anonymous: *Converting a Bayer sensor to true Black & White?*, Open Talk Forum: Digital Photography review, Oct. 1, 2010, (8 pages), XP055149087.

(Continued)

*Primary Examiner* — Amy Hsu
(74) *Attorney, Agent, or Firm* — Lewis Roca Rothgerber Christie LLP

(57) ABSTRACT

A system includes: an image capture device configured to capture image data from a camera system, the image data being in a first mosaic layout; an image display device configured to display the image data in a second mosaic layout; and a processor configured to receive the image data in the first mosaic layout and to supply the image data in the second mosaic layout to the display without intermediate conversion to a fully collocated image layout.

18 Claims, 11 Drawing Sheets

(56) References Cited

U.S. PATENT DOCUMENTS

2015/0009407 A1* 1/2015 Lu .......................... H04N 9/76
                                348/599

FOREIGN PATENT DOCUMENTS

| KR | 10-2011-0020714 A | 3/2011 |
| KR | 10-2012-0089490 A | 8/2012 |
| WO | WO 2012/119191 A1 | 9/2012 |

OTHER PUBLICATIONS

*Canon EOS 450D Bedienungsanleitung*, Oct. 28, 2014, (60 pages), XP055149242.
EPO Search Report dated Nov. 7, 2014, for corresponding European Patent application 14175441.6, (6 pages).
EPO Search Report dated Mar. 13, 2015, for corresponding European Patent application 14175441.6, (17 pages).
Lai, Richard, "Sony shoots out CineAlta F65 4K camera and PMW-TD300 3D camcorder at NAB", Apr. 11, 2011, retrieved from the Internet on Mar. 5, 2015, XP055174141, (9 pages).
Koifman, Vladimir, "Image Sensors World: Sony ClearVid Lands in Digital Cinema Cameras", Apr. 11, 2011, Retrieved from the Internet on Mar. 5, 2015, XP055174123, (2 pages).
Paysam, Bernd, "A High Resolution Display", Retrieved from the Internet on Mar. 5, 2015, Jan. 27, 2013, XP055174153, (2 pages).

* cited by examiner

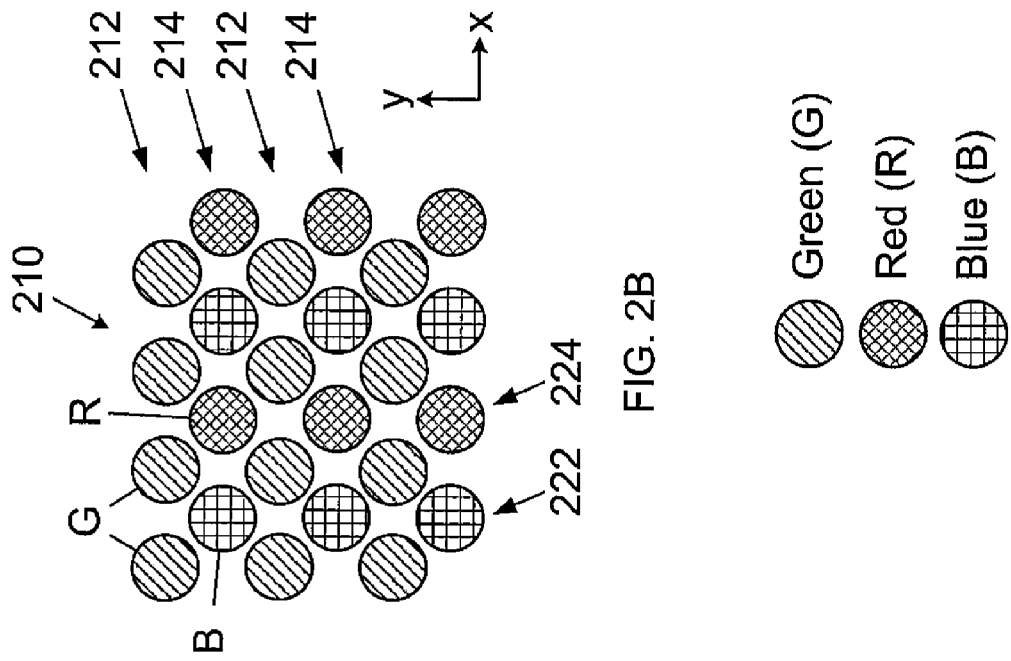
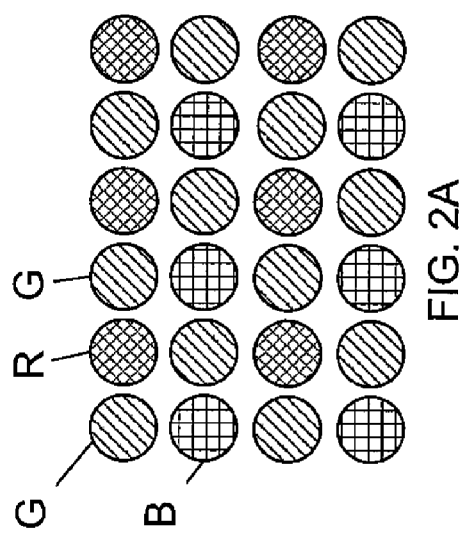
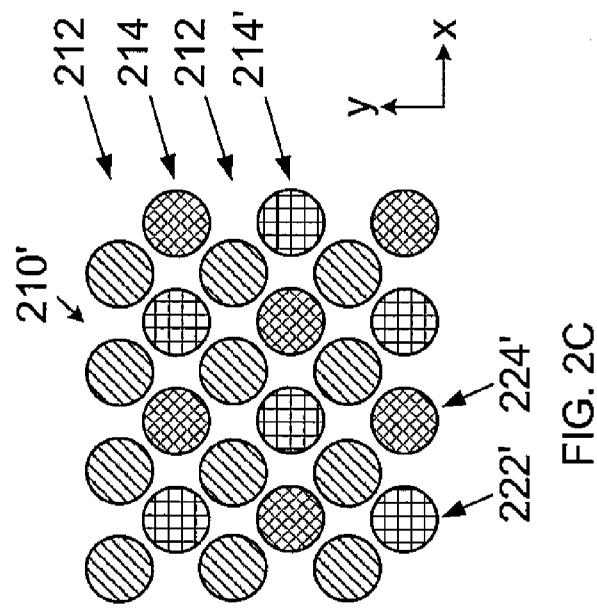
FIG. 2A
FIG. 2B
FIG. 2C

Green (G)
Red (R)
Blue (B)

IMAGE AND VIDEO IN MOSAIC FORMATS

CROSS-REFERENCE TO RELATED APPLICATION

This application claims the benefit of U.S. Provisional Patent Application No. 61/843,871, filed in the United States Patent and Trademark Office on Jul. 8, 2013, the entire disclosure of which is incorporated by reference herein.

FIELD

Embodiments of the present invention relate to the field of digital image display devices, digital image capture devices, data formats for digitally storing captured images, and methods for displaying captured data on display devices.

BACKGROUND

FIG. 1 is a block diagram illustrating an image capture and display device 100, such as a digital camera or a smartphone with integrated camera. Such devices 100 generally include an image capture device 10, which includes an array of light sensitive subpixels. The image capture device 10 may be controlled by a processor 20. When the image capture device 10 is controlled to capture an image, the captured image data may be supplied to the processor 20 which may modify the data (e.g., perform interpolation or demosaic operations) on the received data before storing the data in storage device 30. The storage device 30 may be, for example, NAND flash memory, dynamic random access memory (DRAM), rotating magnetic media (e.g., a hard disk drive), etc. In some embodiments the processor may be configured to control the display device 40 to display images stored on the storage device 30 or images captured by the image capture device 10.

SUMMARY

Embodiments of the present invention are directed to a system in which images captured by an image capture device are stored in accordance with the native layout of the pixels of the image capture device and in which a display device, having a subpixel layout corresponding to the image capture device, displays the captured images without performing demosaic computations.

According to one embodiment of the present invention, a system includes: an image capture device configured to capture image data from a camera system, the image data being in a first mosaic layout; an image display device configured to display the image data in a second mosaic layout; and a processor configured to receive the image data in the first mosaic layout and to supply the image data in the second mosaic layout to the display without intermediate conversion to a fully collocated image layout.

The first mosaic layout may be a Bayer layout, and the second mosaic layout may be a Diamond layout.

The processor may be configured to receive the image data in the Bayer layout and to supply the image data in the Diamond layout to the display by: generating a full green plane of the image data in the Diamond layout from adjacent green pixels of the image data in the Bayer layout; generating red pixels of the image data in the Diamond layout by identifying nearest red pixels in the image data in the Bayer layout; and generating blue pixels of the image data in the Diamond layout by identifying nearest blue pixels in the image data in the Bayer layout.

The first mosaic layout may be a Diamond layout, and the second mosaic layout may also be a Diamond layout.

The processor may be configured to receive the image data in the Diamond layout and to supply the image data in the Diamond mosaic layout to the display by supplying the image data in the Diamond layout directly to the display without interpolation.

The system may further include a storage device, wherein the processor is configured to store the image data in the first mosaic layout on the storage device.

The processor may be further configured to load the image data stored in the first layout on the storage device and to convert the loaded image data in the first layout into the second image data without conversion to a fully collocated layout.

The image data captured from the camera system may be displayed on the image display device on a one-to-one pixel basis.

According to one embodiment of the present invention, a system includes: a storage device configured to store image data, the image data having a first mosaic layout; an image display device configured to display the image data in a second mosaic layout; and a processor configured to receive the image data in the first mosaic layout and to supply the image data in the second mosaic layout to the display without intermediate conversion to a fully collocated image layout.

The first mosaic layout may be a Bayer layout and, the second mosaic layout may be a Diamond layout.

The processor may be configured to receive the image data in the Bayer layout and to supply the image data in the Diamond layout by: generating a full green plane of the image data in the Diamond layout from adjacent green pixels of the image data in the Bayer layout; generating red pixels of the image data in the Diamond layout by identifying nearest red pixels in the image data in the Bayer layout; and generating blue pixels of the image data in the Diamond layout by identifying nearest blue pixels in the image data in the Bayer layout.

The first mosaic layout may be a Diamond layout, and the second mosaic layout may be a Diamond layout.

The processor may be configured to convert the image data in the Diamond layout to the image data in the Diamond layout by supplying the image data in the Diamond layout directly to the display without interpolation.

The image data may be displayed on the image display device on a one-to-one pixel basis.

According to one embodiment of the present invention, a method includes: mapping a first color channel of a first plurality of color channels of first image data in a first mosaic layout to a first color channel of a second plurality of color channels to generate second image data in a second mosaic layout without interpolation; and mapping a second color channel of the first plurality of color channels to a second color channel of the second plurality of color channels without interpolation.

The method may further include: interpolating the image data of a third color channel of the first plurality of color channels to generate a third color channel of the second plurality of color channels.

The first mosaic layout may be a Bayer layout and the second mosaic layout may be a Diamond layout, wherein the first color channel is a red color channel, wherein the second color channel is a blue color channel, wherein the third color channel is a green color channel, wherein the mapping the red color channel of the first color channels to the red color channel of the second color channels includes generating red pixels of the image data in the Diamond layout by identifying nearest red pixels of the image data in the Bayer layout, and wherein the mapping the blue color channel of the first color channels to the blue color channel of the second color channels includes generating blue pixels of the image data in the Diamond layout by identifying nearest blue pixels of the image data in the Bayer layout, and wherein the interpolating the image data of the third color channel of the first plurality of color channels to generate the third color channel of the second plurality of color channels includes generating a full green plane of the image data in the Diamond layout from adjacent green pixels of a green color channel of the color channels the image data in the Bayer layout.

According to one embodiment, an image capture device includes: a plurality of first subpixels sensitive to light in a first spectral range, the plurality of first subpixels being arranged in a plurality of first rows, each of the subpixels of the first rows being sensitive to light in the first spectral range, the first rows extending along a first direction; a plurality of second subpixels sensitive to light in a second spectral range; and a plurality of third subpixels sensitive to light in a third spectral range, the plurality of second pixels and third pixels being arranged in a plurality of second rows, each of the subpixels of the second rows being sensitive to light in the second spectral range or the third spectral range, wherein the first spectral range, the second spectral range, and the third spectral range are different from one another, wherein the first rows are spaced apart from the second rows along a second direction different from the first direction, and wherein the first rows are offset from the second rows along the first direction.

An image display device includes a plurality of subpixels arranged in a plurality of rows and columns, the plurality of rows including: a first row of subpixels, each of the subpixels of the first row being of a first kind configured to emit light in a first spectral range or a second kind configured to emit light in a second spectral range, the subpixels of the first kind and the second kind being alternatingly arranged along the first row; and a second row of subpixels, each of the subpixels of the second row being of the first kind or a third kind configured to emit light in a third spectral range, the subpixels of the first kind and the second kind being alternatingly arrange along the second row, wherein the first spectral range, the second spectral range, and the third spectral range are different from one another.

BRIEF DESCRIPTION OF THE DRAWINGS

The accompanying drawings, together with the specification, illustrate exemplary embodiments of the present invention, and, together with the description, serve to explain the principles of the present invention.

FIG. 2A is a schematic illustration of a Bayer layout of subpixels.

FIG. 2B is a schematic illustration of an alternative layout of subpixels in an image capture device according to one embodiment of the present invention.

FIG. 2C is a schematic illustration of an alternative layout of subpixels in an image capture device according to one embodiment of the present invention.

DETAILED DESCRIPTION

Figure 1:
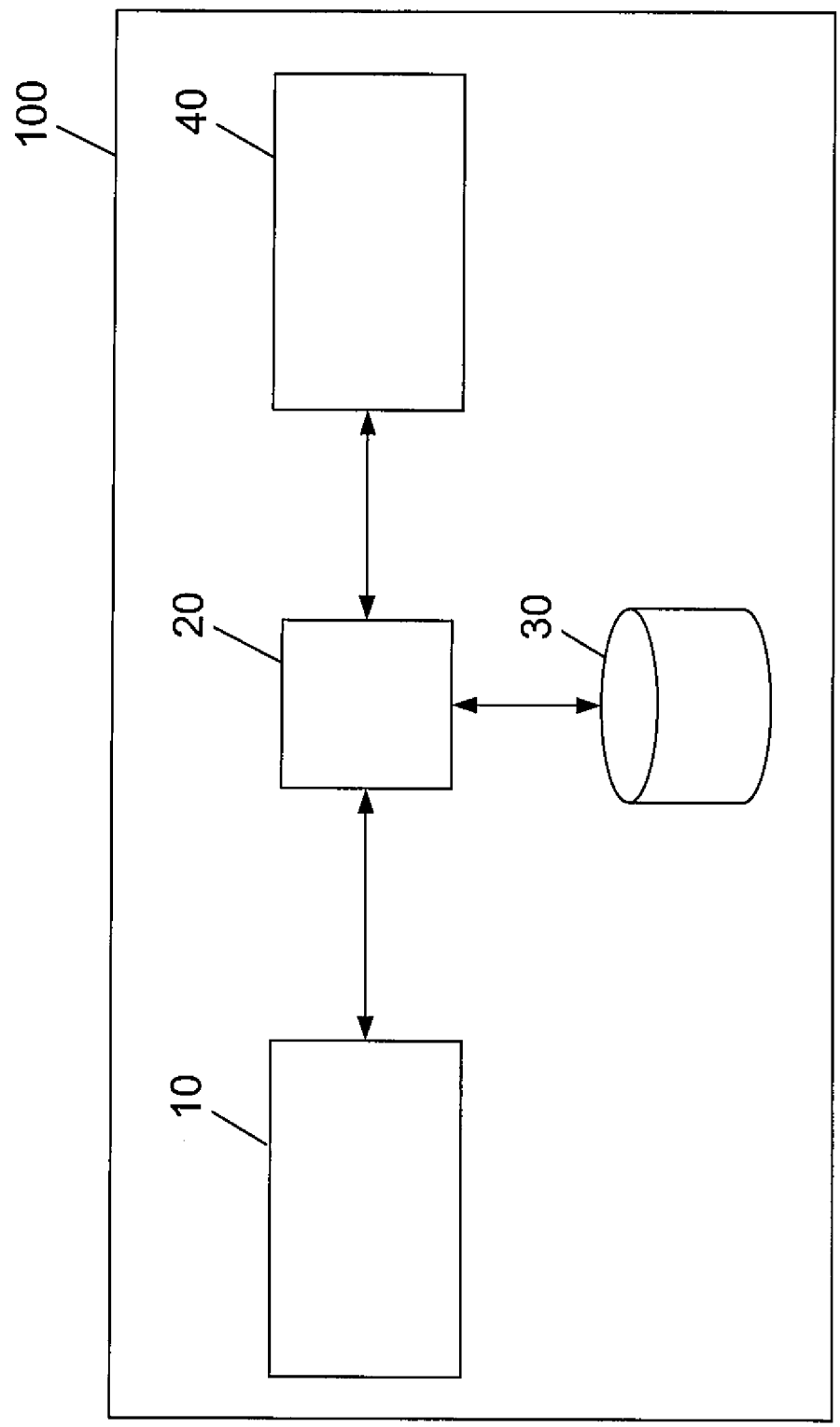
FIG. 1 a schematic illustration of an image capture and display system, such as a digital camera or a mobile phone with an integrated camera.

In the following detailed description, only certain exemplary embodiments of the present invention are shown and described, by way of illustration. As those skilled in the art would recognize, the invention may be embodied in many different forms and should not be construed as being limited to the embodiments set forth herein. Like reference numerals designate like elements throughout the specification.

Referring now back to FIG. 1, an image capture device 10 includes an array of different types (or kinds) of light sensitive elements, each of the different types (or kinds) being sensitive to a different wavelength of light (or a different spectral range) such that only one color intensity value can be captured at any given sample location. In some embodiments these different spectral ranges overlap. FIG. 2A illustrates a comparable arrangement of subpixels in what may be referred to as a Bayer arrangement (described in more detail in U.S. Pat. No. 3,971,065 to Bayer, the entire disclosure of which is incorporated by reference herein). As seen in FIG. 2A, the Bayer arrangement includes twice as many green subpixels (G) as red subpixels (R) or blue subpixels (B), due in part to differences in human eye sensitivity to different wavelengths of light. Because each location on the capture device 10 can only record one of red, green, or blue light, the data from each subpixel is not sufficient to determine color on its own. The recorded color data is typically interpolated to generate complete color information (e.g., red, green, and blue values) for every position on the image plane. Image data that includes complete color information for every location on the image plane will be referred to herein as "collocated color channels."

FIG. 2B illustrates an alternative layout of subpixels in an image capture device according to one embodiment of the present invention. As seen in FIG. 2B, the subpixels 210 are arranged into rows of green subpixels 212 and rows of red and blue subpixels 214. Each of the rows extends along a first direction (e.g., the x-direction as shown in FIG. 2B) and are spaced apart from one another along a second direction (e.g., the y-direction as shown in FIG. 2B). In addition, the subpixels of the green row 212 and the red and blue row 214 are offset from one another along the first direction (e.g., the x-direction) such that subpixels of the green row 212 are not aligned with subpixels of the red and blue row 214 along the second direction (e.g., the y-direction).

In addition, FIG. 2C illustrates another alternative layout of subpixels in an image capture device according to one embodiment of the present invention. As seen in FIG. 2C, the subpixels 210' are arranged into rows in a manner substantially similar to that of the layout of FIG. 2B, with the exception that every other row of red and blue subpixels 214 is reversed. For example, a first row of red and blue subpixels 214 has a blue subpixel in the leftmost column while a second row of red and blue subpixels 214' has a red subpixel in the leftmost column. As such, adjacent columns of red and blue subpixels 222' and 224' also alternate between red and blue subpixels, whereas in the layout of FIG. 2B, adjacent columns of red or blue subpixels are columns that are all red subpixels 222 or all blue subpixels 224.

Although the subpixels 210 are depicted in FIGS. 2B and 2C as being circular and each being the same size, embodiments of the present invention are not limited thereto. For example, the sizes of the pixels may vary in accordance with, for example, the light sensitivity of the detectors used. In addition, the shapes of the light sensitive regions of the may be square, rectangular, or may have other shapes.

Comparable image data formats for storing color image data (e.g., JPEG, TIFF, etc.) generally assume collocated color channels. In other words, comparable image data formats typically store data as if it were possible for each location in the image to simultaneously display multiple colors (e.g., red, green, and blue).

A comparable display device, such as a liquid crystal display (LCD) or an organic light emitting display device, generally displays color images by concurrently displaying red, green, and blue light at various portions of the display. For example, FIG. 3A illustrates an arrangement of pixels, where each of the pixels includes a red subpixel (R), a green subpixel (G), and a blue subpixel (B) arranged in a stripe (or RGB stripe) layout as may be used, for example, in LCD displays.

Figure 3B:
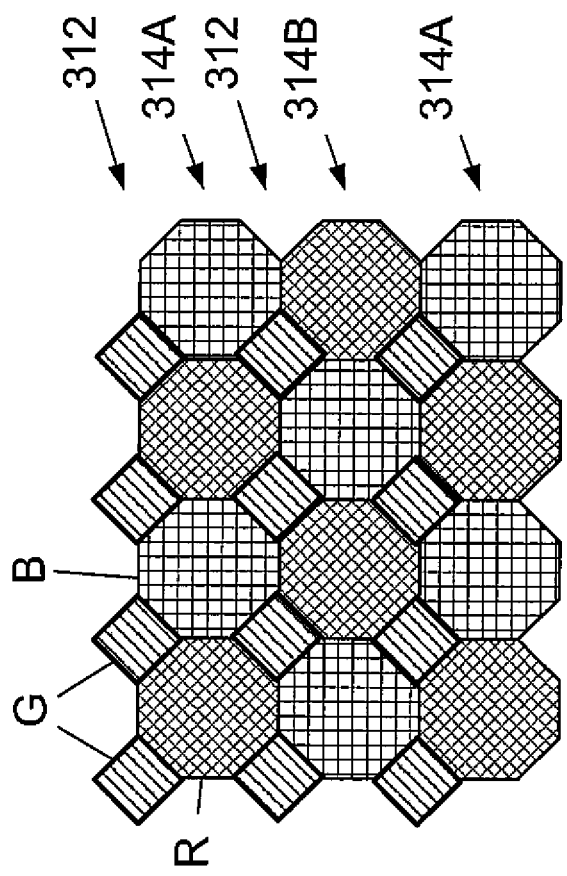
FIG. 3B is a schematic illustration of a display having a Diamond layout.

More recently, display devices with reduced subpixel density but having equivalent effective resolution have been developed. FIG. 3B illustrates one such arrangement, which may be referred to herein as a Diamond layout. in a diamond layout, rows of green subpixels 312 alternate with rows of alternating red and blue subpixels 314A and 314B in which there are equal numbers of red and blue subpixels and twice as many green pixels as there are red subpixels or blue subpixels.

Figure 3A:
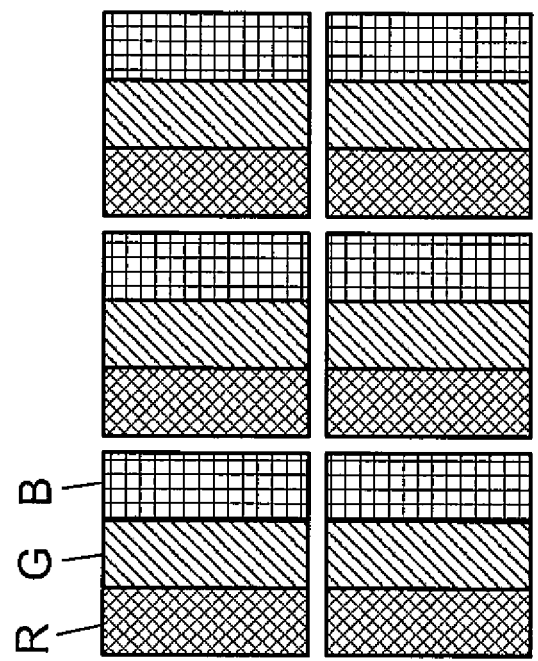
FIG. 3A is a schematic illustration of subpixels in a conventional red-green-blue (RGB) stripe display device.

Due to the mismatch between the layout of comparable image capture devices (e.g., a Bayer layout image capture device as shown in FIG. 2A) and the layout of display devices as shown in FIGS. 3A and 3B, captured image data must be converted into a different format before being displayed on a display device. This conversion process generally involves interpolating the values of the captured pixels to generate collocated image data. However, converting between these different layouts can be computationally intensive and can result in loss of information or degradation in image quality due to interpolation between the layouts of the capture device, the storage format, and the display device.

Figure 4:
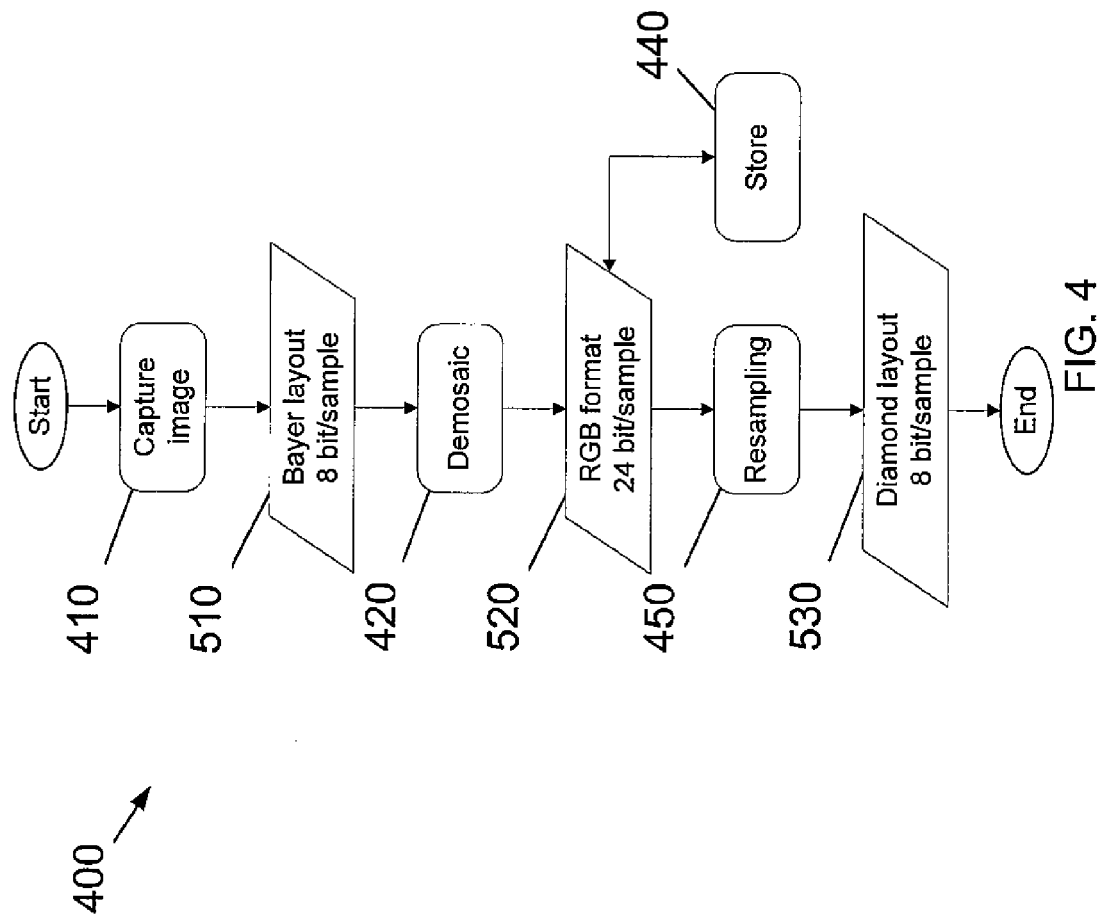
FIG. 4 is a flowchart illustrating a method of converting an image captured using a Bayer layout sensor into an image to be displayed on a Diamond layout display.

In a comparable system, an image is captured by an image capture device having a Bayer layout, the captured Bayer layout image is interpolated by the processor into collocated RGB space for applications to use, then may be converted into another layout (e.g., a Diamond layout) for display. FIG. 4 is a flowchart illustrating a method 400 performed by a processor 20 for capturing an image, storing the image, and displaying the image on a Diamond layout display.

In operation 410, an image is captured as a Bayer layout image 510, where the image may have 8 bits per sample (e.g., 8 bits per sample location). The processor then applies a demosaic operation 420 to the image to arrive at collocated RGB format data 520 having 24 bits per sample location (e.g., 8 bits for each of red, blue, and green for each sample location). The demosaic operation will be described in more detail below with respect to FIG. 5A. In operation 440, the RGB format image data 520 may then be stored in storage device 30. The RGB format image 520 can also be displayed on a display device 40. To be displayed on the display device 40, the RGB format image data is resampled in operation 450 to a resolution and a layout matching the layout of the display device 40. For example, if the display 40 has a Diamond layout (see, e.g., FIG. 3B), then the RGB format image data is resampled in accordance with the Diamond layout.

Figure 5A:
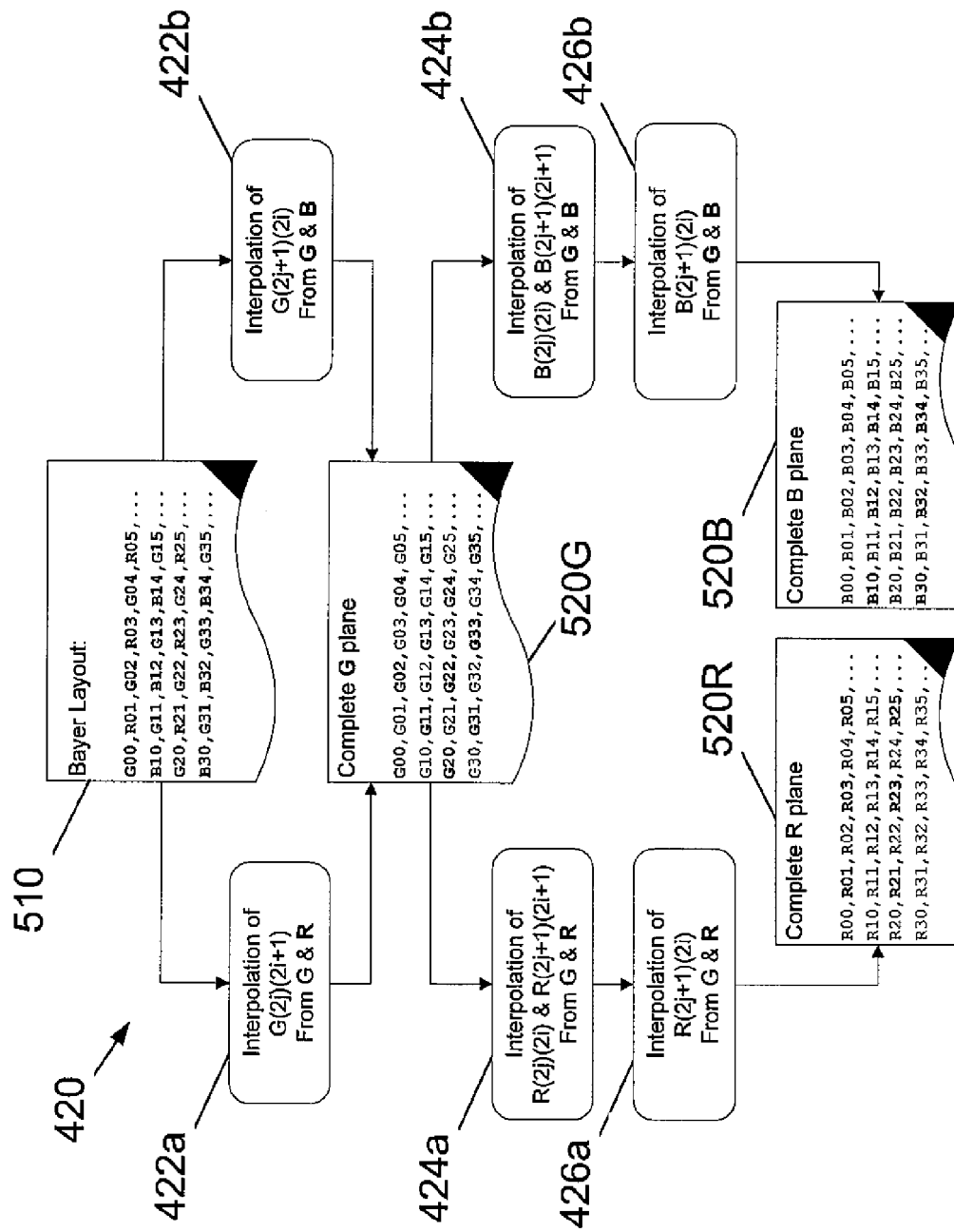
FIG. 5A is a flowchart illustrating an algorithm for converting data captured by an image sensor having a Bayer layout into full RGB data.

FIG. 5A is a flowchart illustrating a method of performing a demosaic operation 420 for converting a captured Bayer layout image 510 to collocated RGB image data 520. In more detail, captured Bayer layout image data 510 includes a plurality of data values which are represented in FIG. 5A as "G00, R01, G02, . . . B10, G11, B12, G13, . . . ," in the format Cxy, where the letter (C) refers to the color of the subpixel element (as chosen from R, G, and B) and values x and y respectively refer to the column and row position of the subpixel element within the image. The captured Bayer layout data is converted into RGB image data 520, including a complete green (G) plane 520G, a complete red (R) plane 520R, and a complete blue (B) plane 520B. In operations 422a and 422b, the values of green pixels and red or blue pixels from the captured Bayer layout data 510 are interpolated to produce pixel data for locations in the complete image plane that do not have corresponding green pixels.

For example, in the Bayer layout image data 510 illustrated in FIG. 5A, locations 01, 03, and 05 are occupied by red sub pixels and locations 10, 12, and 14 are occupied by blue subpixels. As such, in order to fill in the gaps of green data at those locations within the complete green plane 520G, values G01, G03, and G05 are interpolated from neighboring green and red pixels. For example, G01 in the complete green plane 520G may be interpolated from pixels G00, R01, and G02 in the Bayer layout image data 510 and G12 in the complete image plane may be interpolated from pixels G11, B12, and G13.

Similarly, in operations 424a and 426a, the processor 20 computes values for locations in the complete red plane 520R that do not have corresponding captured red data by interpolating from neighboring green and red pixels and in operations 424b and 426b, the processor 20 computes values for locations in the complete blue plane 520B that do not have corresponding captured blue data by interpolating from neighboring green and blue pixels.

Figure 5B:
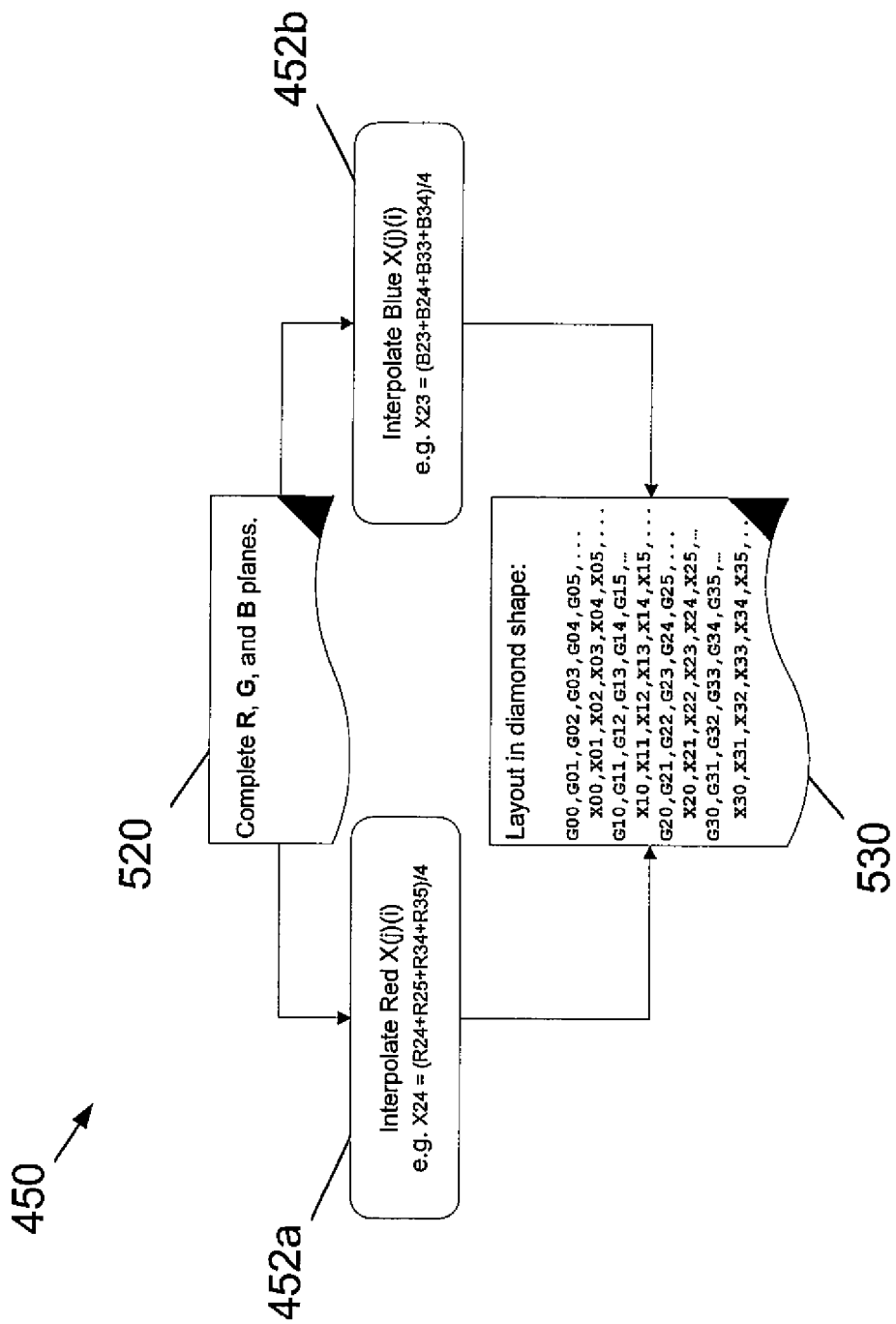
FIG. 5B is a flowchart illustrating an algorithm for converting full RGB image data into image data for display on a display having a Diamond layout.

FIG. 5B is a flowchart illustrating a method of performing a resampling operation 450 to interpolate collocated RGB data 520R, 520G, 520B (collectively 520) to produce image data in a Diamond layout 530 for displaying the data on a Diamond layout display. In operation 452a red pixels are interpolated from neighboring red pixels (e.g., X24 may be the arithmetic mean of pixels R24, R25, R34, and R35 in the complete red plane 520R). Similarly, in operation 452b, blue pixels are interpolated from neighboring blue pixels (e.g., X23 may be the arithmetic mean of pixels B24, B25, B34, and B35 in the complete blue plane 520B).

However, the demosaicing processes described above for converting from the Bayer layout to the collocated RGB layout and for converting from the collocated RGB layout to the Diamond layout involves extensive interpolation of values to convert between different layouts in order to store and display images, thereby increasing processing requirements and resulting in reduced image quality due to the introduction of visual artifacts as a result of the demosaicing process. As such, the images that are captured in a Bayer format and stored in a collocated image format have reduced quality even before they are displayed. In addition, as described above, images in a collocated image format also undergo reduction in quality when converted for display on a variety of display devices such as a Diamond layout display.

According to one embodiment of the present invention, a system 100 including an image capture device 10 is configured to capture images and to store the captured images in accordance with the native layout of the pixels of the image capture device. In some embodiments, system further includes a display device 40 having a subpixel layout corresponding to (e.g., matching) the image capture device and is configured to display the captured images without performing a demosaic computation. The layout of the image data may be referred to herein as a "mosaic layout" or a "mosaic format", wherein only one color value of a specific color channel is allowed at each location within the image (g., at each location within the two dimensional area of the image). As such, images stored in an uncompressed mosaic format can take up only approximately ⅓ of the uncompressed data size of a comparable image stored in a conventional image format.

According to one embodiment of the present invention, a substantially uniform pipeline in which the capture layout and display layout are synchronized allows visual content (e.g., image or video) to be stored its native, non-collocated mosaic format for storage with reduced or no loss of quality due to interpolation (e.g., interpolation due to conversion to collocated RGB space). By synchronizing the capturer, the storage format, and/or the display layout, the overall visual quality can be increased while using only one third (⅓) of the conventional bandwidth for storing, delivering, and presenting the uncompressed original visual data.

Embodiments of the present invention are also directed to an image and video format that is native to both capture and display devices and that is capable of providing higher quality images for the human visual system. By storing visual data in a "native" mosaic format (or its compressed variations), embodiments of the present invention can reduce data bandwidth, reduce data loss due to interpolation, and can reduce errors that may be introduced due to multiple intermediate color conversions and interpolations between native layouts (e.g., Bayer), storage layouts (e.g., full collocated RGB), and display layouts (e.g., Diamond). Embodiments of the present invention can also increase the visual quality for given communication bandwidth and storage space, and provide lower cost display solutions at high quality for various layouts of image capture devices.

Figure 6:
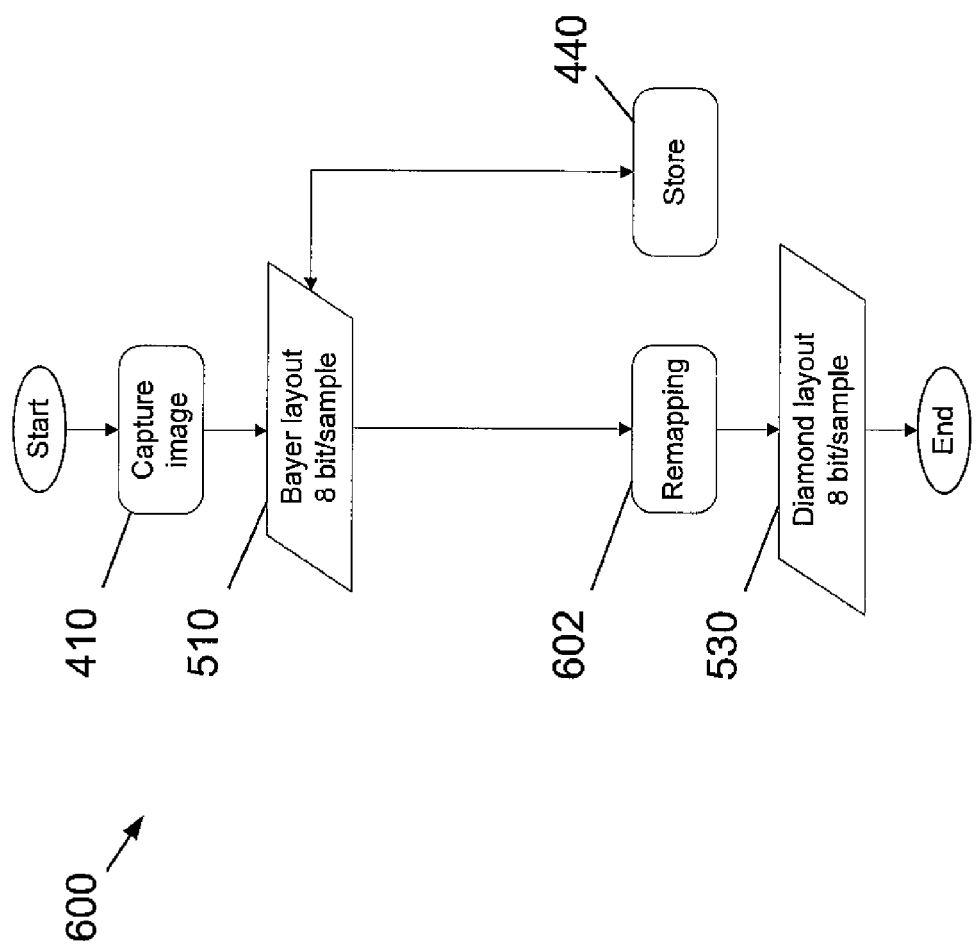
FIG. 6 is an illustration of an algorithm for converting data captured by an image sensor having a Bayer layout into data for display having a Diamond layout in accordance with one embodiment of the present invention.

FIG. 6 is an illustration of a method 600 for converting data captured by an image sensor having a Bayer layout into data for display having a Diamond layout in accordance with one embodiment of the present invention. Referring to FIG. 6, an image may be captured in operation 410 an image capture device having a Bayer layout. The Bayer layout image data 510 may be stored in the storage device 30 in operation 440 in its native format (e.g., in a data format that preserves the original Bayer layout of the data). When the Bayer layout image data 510 is to be displayed on a display device having a Diamond layout, the image can be remapped to the Diamond layout 530 in operation 602.

Figure 7:
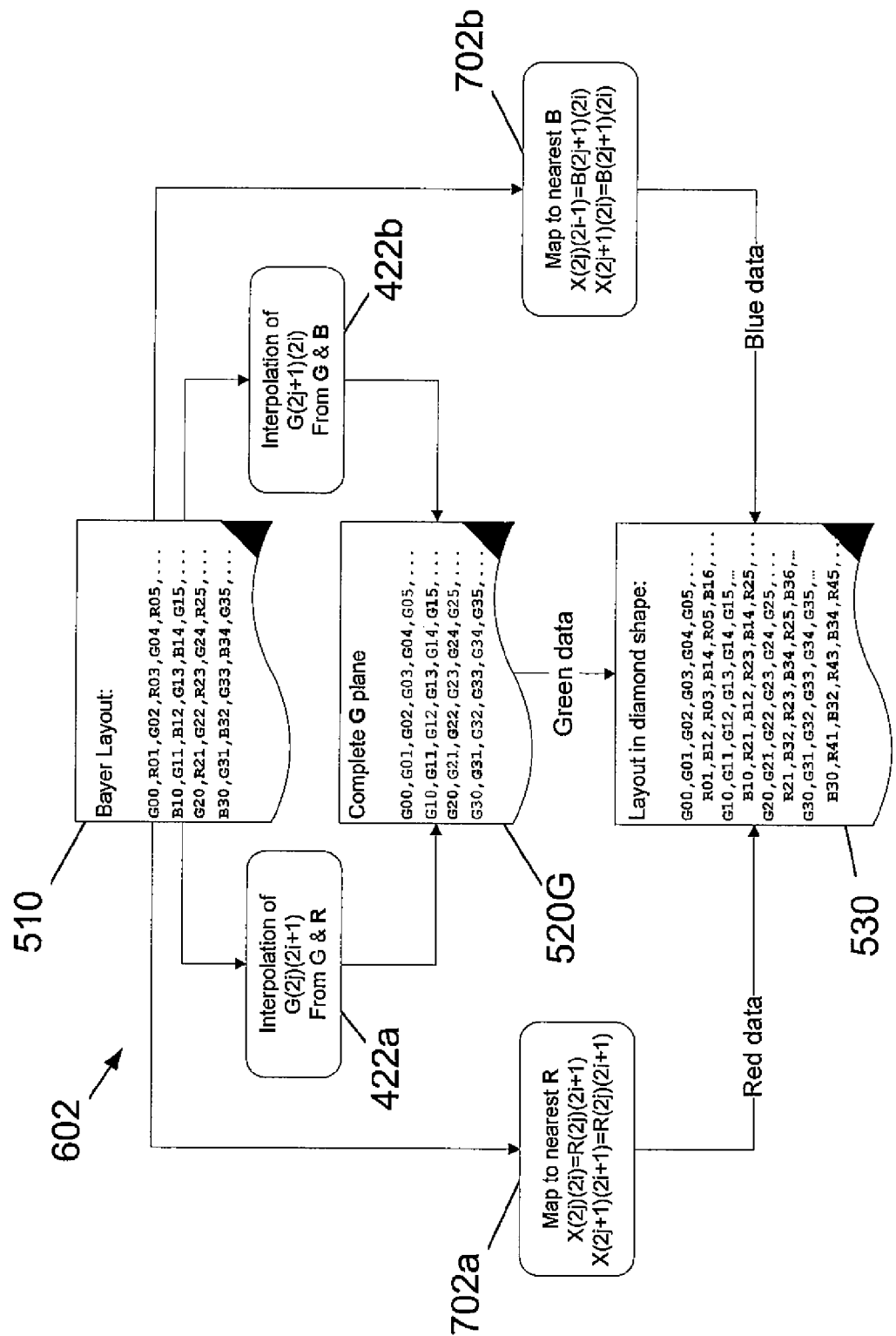
FIG. 7 is an illustration of an algorithm for converting data from a Bayer layout for display on a display having a Diamond layout in accordance with one embodiment of the present invention.

FIG. 7 is a flowchart illustrating a method 602 according to one embodiment of the present invention for converting Bayer layout image data 510 into Diamond layout image data 530 without performing an intermediate demosaic, conversion, or interpolation of data into full collocated RGB data. In other words, embodiments of the present invention are directed to systems and methods for "remapping" color information data from a first layout to a second layout without interpolating (e.g., constructing new data points from known data points) color information data of subpixels in the first layout to generate color information data for subpixels in the second layout. Embodiments of the present invention are not intended to exclude the possibility of interpolating pixels when scaling or resizing images while maintaining the same layout (e.g., zooming in on a Diamond layout image). As described above with respect to FIG. 5A, in operations 422a and 422b, the values of green pixels and red or blue pixels from the captured Bayer layout data 510 are interpolated to produce pixel data for a complete green image plane 520G.

In operation 702a, the values of the red subpixels in the Diamond layout display layout 530 are mapped from the nearest locations in the original Bayer layout $(X(2j)(2i)=R(2j)(2i+1)$ and $X(2j+1)(2i+1)=R(2j)(2i+1))$. Similarly, in operation 702b, the blue subpixels are mapped from the nearest locations in the original Bayer layout $(X(2j)(2i-1)=B(2j+1)(2i)$ and $X(2j+1)(2i)=B(2j+1)(2i))$. In some embodiments of the present invention, if there are multiple subpixels of the original Bayer layout that are equidistant from the location of the corresponding pixel in the Diamond layout, the value of the pixel in the Diamond layout can be computed by averaging the values of the equidistant pixels of the original Bayer layout or by using color voting among the equidistant pixels. Alternatively, in some embodiments a subpixel in a particular direction is always used (e.g., the leftmost and uppermost pixel of the equidistant pixels). As such, according to one embodiment of the present invention, captured image data in the Bayer layout is stored in its native format and converted to be displayed on a Diamond layout display without an intermediate conversion to a collocated RGB format, thereby reducing visual artifacts and reducing bandwidth and storage requirements while maintaining higher levels of visual quality due to a reduced number of interpolation operations (e.g., only interpolating positions in the green channel).

Figure 8:
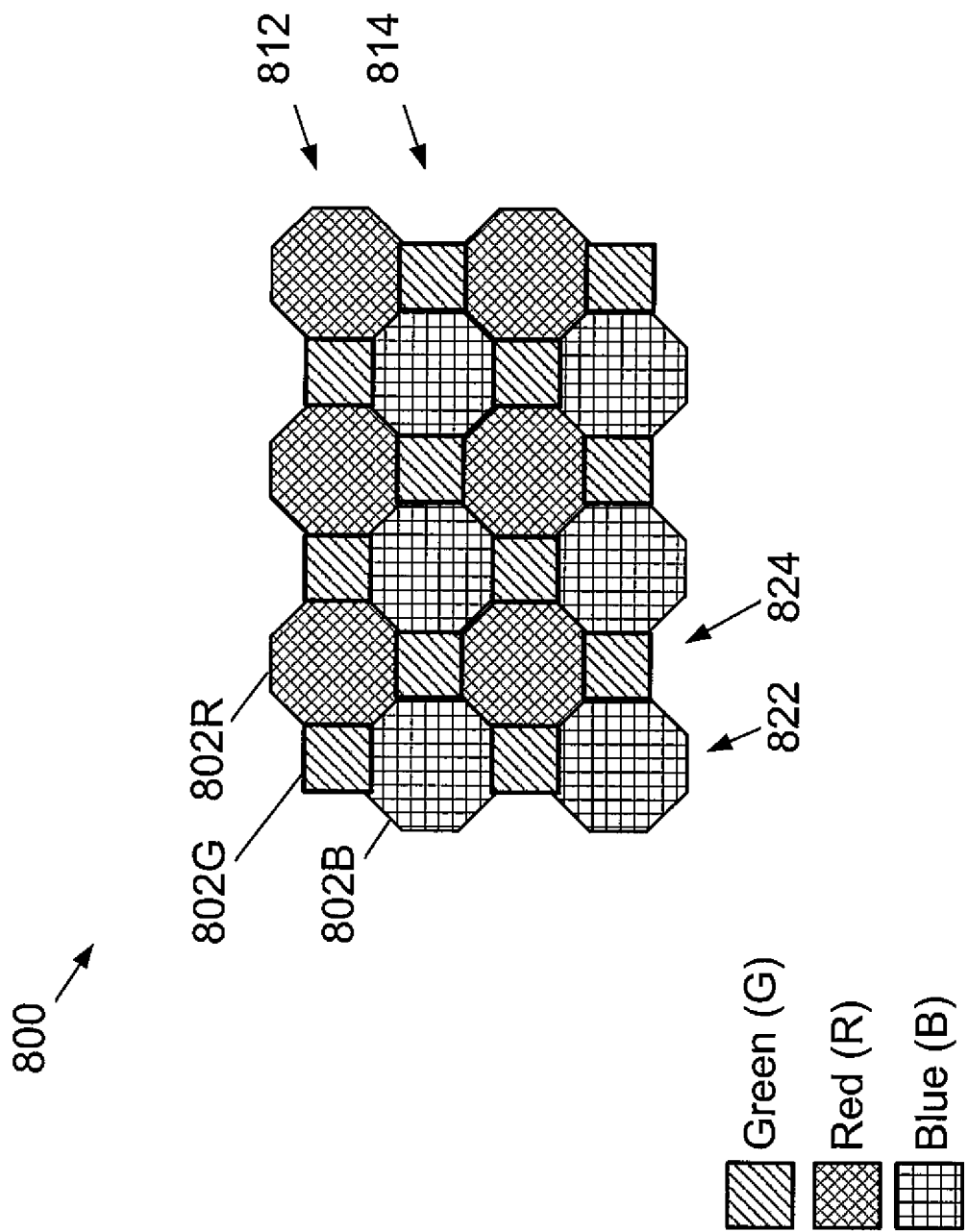
FIG. 8 is a schematic illustration of a layout of subpixels in a display having a Bayer-like layout according to one embodiment of the present invention.

In one embodiment of the present invention, image quality can be further improved by matching the subpixel layouts of the image capture, storage, and display components. FIG. 8 is a schematic illustration of a layout of subpixels in a display having a Bayer-like layout according to one embodiment of the present invention. The display device 40 is a display device (e.g., an organic light emitting display device, a liquid crystal display device, a plasma display panel, or a cathode ray tube) having subpixels 802 (or a "color filter array") arranged in a Bayer-like layout 800 similar to the Bayer pattern (shown, for example, in FIG. 2A).

As shown in FIG. 8, in a display device according to one embodiment of the present invention, there are two green subpixels 802G for every red subpixel 802R and two green subpixels 802G for every blue subpixel 802B. While embodiments of the present invention are described herein as including "red," "green," and "blue" subpixels, embodiments of the present invention are not limited thereto and may include different types (or kinds) of subpixels, each type (or kind) being configured to emit light over a different spectral range. In some embodiments these different spectral ranges partially overlap.

In one embodiment of the present invention, as shown in FIG. 8, the subpixels 802 are arranged along a plurality of rows and columns. Along a first row 812, red subpixels 802R are arranged between adjacent green subpixels 802G and the red subpixels 802R are located adjacent the green subpixels 802G without differently colored subpixels located therebetween (e.g., without blue subpixels in between). As such, the red subpixels 802R and the green subpixels 802G may be referred to as "alternatingly arranged" along the first row 812. Similarly, along a second row 814, blue subpixels 802B are arranged between adjacent green subpixels 802G and the blue subpixels 802B are located adjacent the green subpixels 802G without differently colored subpixels being located therebetween (e.g., without red subpixels in between). As such, the blue subpixels 802B and the green subpixels 802G may be referred to as alternatingly arranged along the second row 814.

Similarly, along a first column 822, blue subpixels 802B are arranged between adjacent green subpixels 802G and the blue subpixels 802B are located adjacent the green subpixels 802G without differently colored subpixels being located therebetween (e.g., without red subpixels in between) and along a second column 824, red subpixels 802R are arranged between adjacent green subpixels 802G and the red subpixels 802R are located adjacent the green subpixels 802G without differently colored subpixels located therebetween (e.g., without blue subpixels in between). As such, blue subpixels 80213 and green subpixels 802G are alternatingly arranged along the first column 822 and red subpixels 802R and green subpixels 802G are alternatingly arranged along the second column 824.

In addition, in one embodiment of the present invention, as shown, for example, in FIG. 8, each of the green subpixels 802G has a smaller area (e.g., a smaller light emitting area) than the red subpixels 802R and the blue subpixels 802B to compensate for the differing numbers of subpixels of each color. Furthermore, in some embodiments of the present invention, the relative sizes of the red subpixels 802R, green subpixels 802G, and blue subpixels 802B may be varied in accordance with a light emitting efficiency and operating lifespan of the pixels 802. For example, in an organic light emitting display device, red subpixels may be smaller than blue subpixels to reduce the current density through the blue pixels to increase the operating lifespan of the blue pixels. However, embodiments of the present invention are not limited thereto and the relative sizes of the differently colored subpixels may be varied based on the relative light emitting efficiencies, operating lifespans, or other characteristic differences between the subpixels.

As such, and referring back to FIG. 1, according to one embodiment of the present invention, images captured by an image sensor 10 having a mosaic layout (e.g., a Bayer layout) are stored on a storage device 30 in the native mosaic layout of the CMOS sensor (e.g., a Bayer layout) and can be displayed directly on a display device 40 having a matching mosaic layout (e.g., a Bayer-like layout) as shown in FIG. 8 without interpolation at any stage, thereby reducing or avoiding artifacts and other degradation in image quality due to an interpolation (or demosaic) process and thereby further reducing image processing requirements before and after storing the captured image.

Similarly, according to another embodiment of the present invention, images captured by an image sensor 10 having a diamond like layout (e.g., as shown in FIG. 2C) can be displayed directly on a display device 40 having a matching layout (e.g., a Diamond layout as shown in FIG. 313) without interpolation at any stage.

Figure 9:
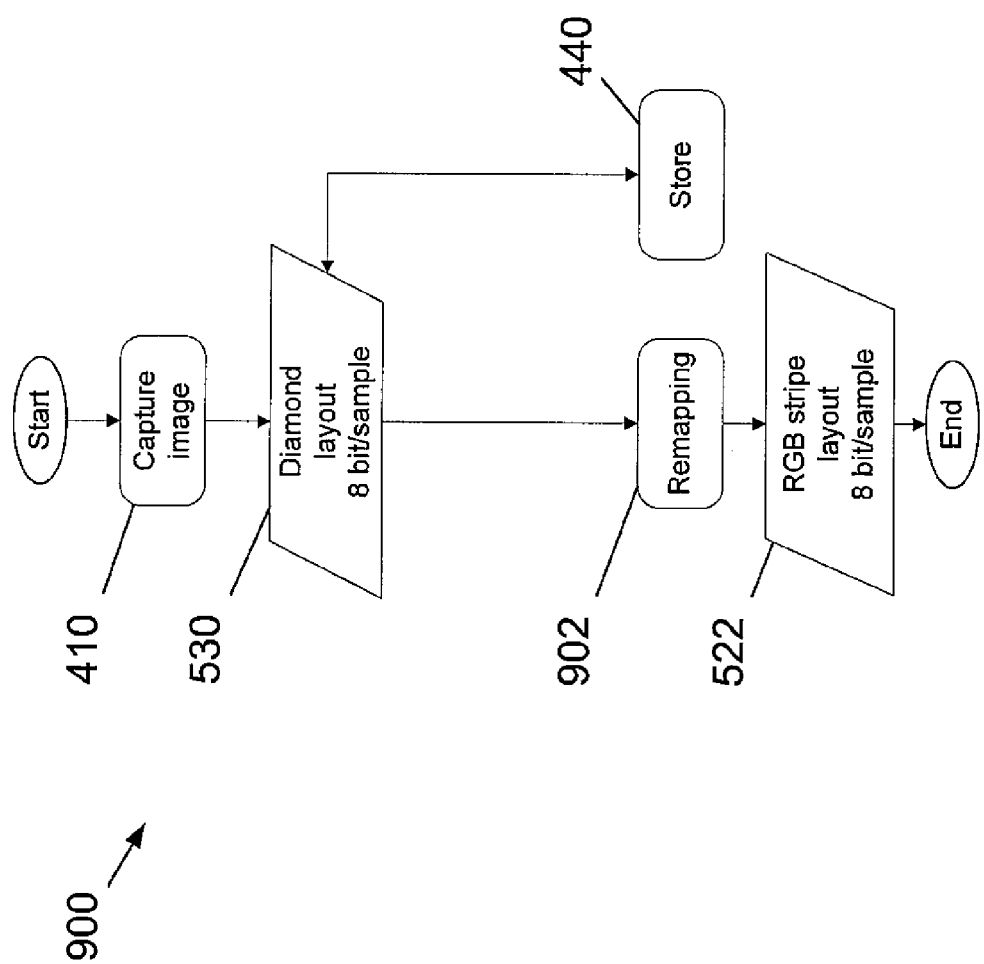
FIG. 9 is a flowchart illustrating a method for converting a captured image from a mosaic layout to a diamond layout according to one embodiment of the present invention.

FIG. 9 is a flowchart illustrating a method 1000 according to one embodiment of the present invention for remapping mosaic image data 512 into RGB stripe layout image data 522 (e.g., the layout illustrated, for example, in FIG. 3A) without performing an intermediate conversion or interpolation of data into full collocated RGB data.

For example, if the captured image data has a Diamond format as shown in FIG. 2C and as illustrated below in Table 1:

TABLE 1

$R_{00}\ B_{01}\ R_{02}\ B_{03}\ R_{04}\ B_{05}\ \ldots$
$G_{00}\ G_{01}\ G_{02}\ G_{03}\ G_{04}\ G_{05}\ \ldots$
$\text{- - -}\ R_{11}\ B_{12}\ R_{13}\ B_{14}\ R_{15}\ B_{16}\ \ldots$
$G_{10}\ G_{11}\ G_{12}\ G_{13}\ G_{14}\ G_{15}\ \ldots$
$R_{20}\ B_{21}\ R_{22}\ B_{23}\ R_{24}\ B_{25}\ \ldots$
$G_{20}\ G_{21}\ G_{22}\ G_{23}\ G_{24}\ G_{25}\ \ldots$
$\text{- - -}\ R_{31}\ B_{32}\ R_{33}\ B_{34}\ R_{35}\ B_{36}\ \ldots$ and if an output device (e.g., display or printer) uses the RGB stripe layout as shown in FIG. 3A and as illustrated below in Table 2:

TABLE 2

| $r_{00}$ | $g_{00}$ | $b_{00}$ | $r_{01}$ | $g_{01}$ | $b_{01}$ | $r_{02}$ | $g_{02}$ | $b_{02}$ | ... |
| $r_{10}$ | $g_{10}$ | $b_{10}$ | $r_{11}$ | $g_{11}$ | $b_{11}$ | $r_{12}$ | $g_{12}$ | $b_{12}$ | ... |
| $r_{20}$ | $g_{20}$ | $b_{20}$ | $r_{21}$ | $g_{01}$ | $b_{21}$ | $r_{22}$ | $g_{22}$ | $b_{22}$ | ... |

Then, in operation 902 the captured image data 512 having a Diamond mosaic layout can be mapped directly to the output RGB stripe image data 522 by selecting the closest corresponding color values. For example, Table 3:

TABLE 3

| $g_{11} = G_{11}$, | $g_{12} = G_{12}$, | $g_{21} = G_{21}$, | $g_{22} = G_{22}$ |
| $r_{11} = R_{11}$, | $r_{12} = R_{22}$, | $r_{21} = R_{31}$, | $r_{22} = R_{22}$ |
| $b_{11} = B_{12}$, | $b_{12} = B_{23}$, | $b_{21} = B_{32}$, | $b_{22} = B_{23}$ |

To generalize, according to one embodiment, color values $g_{ij}$, $r_{ij}$, and $b_{ij}$ of the RGB stripe layout are remapped from the captured Diamond layout data as follows:

$$g_{ij} = G_{ij}$$

$$r_{ij} = \begin{cases} R_{ij} & \text{if } i = j \bmod 2 \\ R_{i+1\,j} & \text{if } i \ne j \bmod 2 \end{cases}$$

$$b_{ij} = \begin{cases} B_{ij+1} & \text{if } i = j \bmod 2 \\ B_{i+1\,j+1} & \text{if } i \ne j \bmod 2 \end{cases}$$

As seen above, during the remapping process, no interpolation of color values is performed (for example, the value of a red pixel r in the output stripe layout image is not computed by averaging or otherwise combining the values of more than one red pixel R in the input Diamond layout image, but rather is the actual color value of one pixel in the input image).

Figure 10:
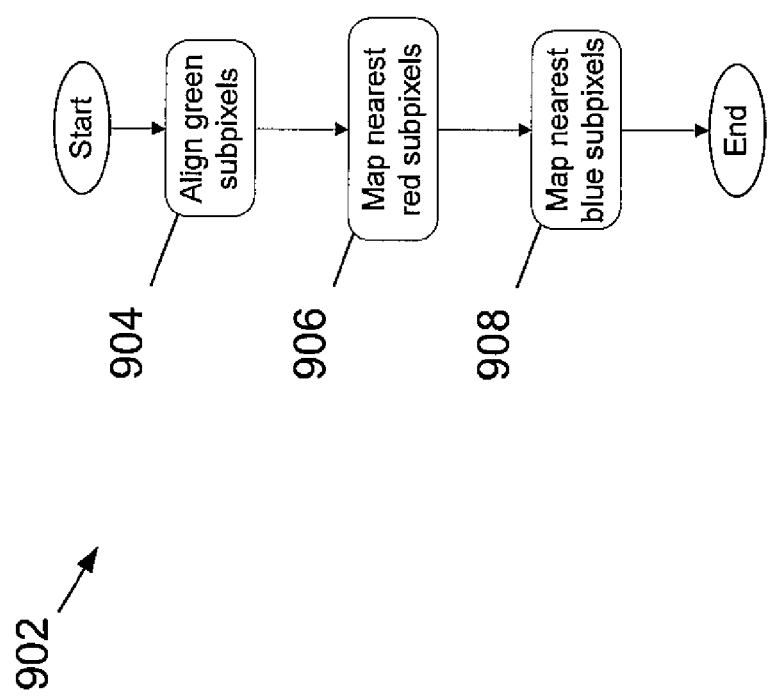
FIG. 10 is a flowchart illustrating a method for converting image data into RGB stripe layout image data according to one embodiment of the present invention.

FIG. 10 is a flowchart illustrating the remapping operation 902 according to one embodiment of the present invention. The remapping operation 902 may include aligning the locations of the green subpixels of the Diamond layout with the RGB stripe image layout in operation 904 (or remapping the color values from the green pixels in the source Diamond layout image to corresponding locations in the output image having an RGB stripe layout), then filling in the values of the red and blue subpixels of the RGB stripe image layout by mapping the color values of the nearest corresponding red and blue subpixels of the captured Diamond layout image in operations 906 and 908. If multiple subpixels of the captured Diamond layout image are equidistant from the output RGB strip layout image, then color voting, color averaging, or tie breaking according to a direction may be used to supply the value of the subpixel in the output having the RGB stripe image layout. Embodiments of the present invention are not limited to the particular order of operations shown herein. For example, the mapping of color values of subpixels of different colors may occur concurrently or may be interleaved.

As such, one embodiment of the present invention provides a system and method for converting image data captured in a Diamond mosaic layout 512 to RGB stripe layout data without intermediate conversion into fully collocated RGB data.

Although embodiments of the present invention are described above with respect to image capture devices and image data storage formats having a Bayer layout, embodiments of the present invention are not limited thereto.

For example, according to another embodiment of the present invention, a system for capturing, storing, and displaying images comprises an image sensor 10 having subpixels arranged in a Diamond-like layout in accordance with FIG. 2B, wherein a first row of subpixels includes only green subpixels and an adjacent row of subpixels includes blue and red subpixels arranged in an alternating pattern. This pattern of a first row of all green pixels and a second row of alternating blue and red pixels may be repeated to cover the area of the image sensor 10, as shown in FIG. 2B.

The system may be configured to store images in a mosaic data format corresponding to the Diamond-like layout of the image sensor shown in FIG. 2C. When images stored in a Diamond-like image format are displayed on a display device having a Diamond layout, no conversion of image data is necessary before display, thereby improving image quality.

Although embodiments of the present invention are described in the context of components of a single device (e.g., a digital camera or a smartphone with integrated camera), embodiments of the present invention are not limited thereto. For example, embodiments of the present invention may also include a computer system such as a processing unit including a processor, storage, and input/output interfaces for receiving image data (e.g., from an external camera or a network connection) and for communicating with a display device coupled to the computer system.

Although embodiments of the present invention are described above with respect to captured image data being displayed on a one-to-one pixel (or "1:1 pixel mapping") basis, embodiments of the present invention also allow scaling of image data to match a display resolution without loss of quality due to conversion between display layouts.

In addition, the processor 20 may be implemented in various ways without departing from the spirit and scope of the present invention. In some embodiments, the processor 20 may be a general purpose central processing unit (e.g., a processor based on an ARM or x86 architecture) coupled to memory storing instructions to be executed on the processor 20 to perform given functions. In other embodiments the processor is a field programmable gate array (FPGA) programmed to perform the given operations. In still other embodiments, the processor is an application specific integrated circuit (ASIC) specifically designed to perform operations in accordance with embodiments of the present invention, where the logical operations are embodied in the physical structure of the ASIC.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A system comprising:
an image capture device configured to capture image data from a camera system, the image data being in a first mosaic layout;
an image display device configured to display the image data in a second mosaic layout; and
a processor configured to receive the image data in the first mosaic layout and to supply the image data in the second mosaic layout to the display without intermediate conversion to a fully collocated image layout,
wherein the second mosaic layout is a Diamond layout.

2. The system of claim 1, wherein the first mosaic layout is a Bayer layout.

3. The system of claim 2, wherein the processor is configured to receive the image data in the Bayer layout and to supply the image data in the Diamond layout to the display by:
generating a full green plane of the image data in the Diamond layout from adjacent green pixels of the image data in the Bayer layout;
generating red pixels of the image data in the Diamond layout by identifying nearest red pixels in the image data in the Bayer layout; and
generating blue pixels of the image data in the Diamond layout by identifying nearest blue pixels in the image data in the Bayer layout.

4. The system of claim 1, wherein the first mosaic layout is a Diamond layout.

5. The system of claim 4, the processor is configured to receive the image data in the Diamond layout and to supply the image data in the Diamond mosaic layout to the display by supplying the image data in the Diamond layout directly to the display without interpolation.

6. The system of claim 1, further comprising a storage device, wherein the processor is configured to store the image data in the first mosaic layout on the storage device.

7. The system of claim 6, wherein the processor is further configured to load the image data stored in the first mosaic layout on the storage device and to convert the loaded image data in the first mosaic layout into the second mosaic layout without conversion to a fully collocated layout.

8. The system of claim 1, wherein the image data captured from the camera system is displayed on the image display device on a one-to-one pixel basis.

9. A system comprising:
a non-volatile storage device configured to store image data having a first mosaic layout;

an image display device configured to display the image data in a second mosaic layout; and a processor configured to receive the image data in the first mosaic layout and to supply the image data in the second mosaic layout to the display without intermediate conversion to a fully collocated image layout.

10. The system of claim 9, wherein the first mosaic layout is a Bayer layout, and, wherein the second mosaic layout is a Diamond layout.

11. The system of claim 10, wherein the processor is configured to receive the image data in the Bayer layout and to supply the image data in the Diamond layout by:

generating a full green plane of the image data in the Diamond layout from adjacent green pixels of the image data in the Bayer layout;

generating red pixels of the image data in the Diamond layout by identifying nearest red pixels in the image data in the Bayer layout; and generating blue pixels of the image data in the Diamond layout by identifying nearest blue pixels in the image data in the Bayer layout.

12. The system of claim 9, wherein the first mosaic layout is a Diamond layout, and wherein the second mosaic layout is a Diamond layout.

13. The system of claim 12, wherein the processor is configured to convert the image data in the Diamond layout to the image data in the Diamond layout by supplying the image data in the Diamond layout directly to the display without interpolation.

14. The system of claim 9, wherein the image data is displayed on the image display device on a one-to-one pixel basis.

15. A method comprising:

mapping, by a processor, a first color channel of a first plurality of color channels of first image data in a first mosaic layout to a first color channel of a second plurality of color channels to generate second image data in a second mosaic layout without interpolation;

mapping, by a processor, a second color channel of the first plurality of color channels to a second color channel of the second plurality of color channels without interpolation; and interpolating, by a processor, the image data of a third color channel of the first plurality of color channels to generate a third color channel of the second plurality of color channels.

16. The method of claim 15, wherein the first mosaic layout is a Bayer layout and the second mosaic layout is a Diamond layout, wherein the first color channel is a red color channel,
wherein the second color channel is a blue color channel,
wherein the third color channel is a green color channel,
wherein the mapping the red color channel of the first color channels to the red color channel of the second color channels comprises generating red pixels of the image data in the Diamond layout by identifying nearest red pixels of the image data in the Bayer layout, wherein the mapping the blue color channel of the first color channels to the blue color channel of the second color channels comprises generating blue pixels of the image data in the Diamond layout by identifying nearest blue pixels of the image data in the Bayer layout, and wherein the interpolating the image data of the third color channel of the first plurality of color channels to generate the third color channel of the second plurality of color channels comprises generating a full green plane of the image data in the Diamond layout from adjacent green pixels of a green color channel of the color channels the image data in the Bayer layout.

17. An image capture device comprising:

a plurality of first subpixels sensitive to light in a first spectral range, the plurality of first subpixels being arranged in a plurality of first rows, each of the subpixels of the first rows being sensitive to light in the first spectral range, the first rows extending along a first direction;

a plurality of second subpixels sensitive to light in a second spectral range; and a plurality of third subpixels sensitive to light in a third spectral range, the plurality of second subpixels and third subpixels being arranged in a plurality of second rows, each of the subpixels of the second rows being sensitive to light in the second spectral range or the third spectral range, wherein the first spectral range, the second spectral range, and the third spectral range are different from one another, wherein the first rows are spaced apart from the second rows along a second direction different from the first direction, and wherein the first rows are offset from the second rows along the first direction.

18. An image display device comprising a plurality of subpixels arranged in a plurality of rows and columns, the plurality of rows comprising:

a first row of subpixels, each of the subpixels of the first row being of a first kind configured to emit light in a first spectral range or a second kind configured to emit light in a second spectral range, the subpixels of the first kind and the second kind being alternatingly arranged along the first row; and a second row of subpixels, each of the subpixels of the second row being of the first kind or a third kind configured to emit light in a third spectral range, the subpixels of the first kind and the third kind being alternatingly arranged along the second row, wherein the first spectral range, the second spectral range, and the third spectral range are different from one another.

* * * * *